Jan. 6, 1925.　　　　　　　　　　　　　　　　1,521,780
J. MASKI
CAMERA
Filed Sept. 25, 1923

INVENTOR.
J. MASKI.

Patented Jan. 6, 1925.

1,521,780

UNITED STATES PATENT OFFICE.

JOSEPH MASKI, OF TORONTO, ONTARIO, CANADA.

CAMERA.

Application filed September 25, 1923. Serial No. 664,756.

*To all whom it may concern:*

Be it known that I, JOSEPH MASKI, a subject of the Republic of Poland, but having declared my intention of becoming a citizen of the United States, and having taken out my first naturalization papers, residing in the city of Toronto, in the county of York, in the Province of Ontario, Canada, have invented certain new and useful Improvements in Cameras, of which the following is the specification.

My invention relates to improvements in cameras of the type disclosed in my United States application Number 592,096 filed October 3, 1922 and the object of the present invention is to devise means whereby the lens is held by the weight of the shutter in its fully opened position during the focusing operation and is automatically closed to any predetermined extent by the movement of the shutter to the picture taking position and it consists essentially of the arrangement and construction of parts as hereinafter more particularly explained.

In the drawings like characters of reference indicate corresponding parts in the different views.

Figure 1:
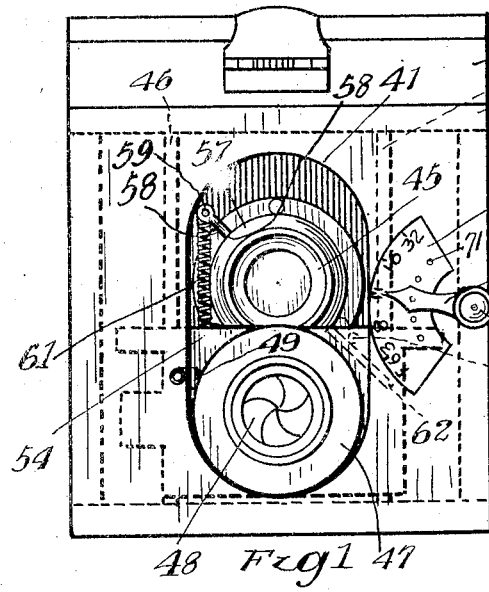
Fig. 1 is a front elevation of my camera showing the shutter and lens in the position they assume when the picture is being focused.
Figure 2:
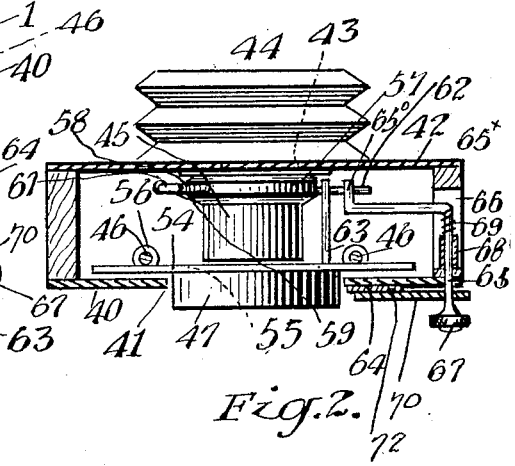
Fig. 2 is a sectional plan view showing the lens and shutter in full.
Figure 3:
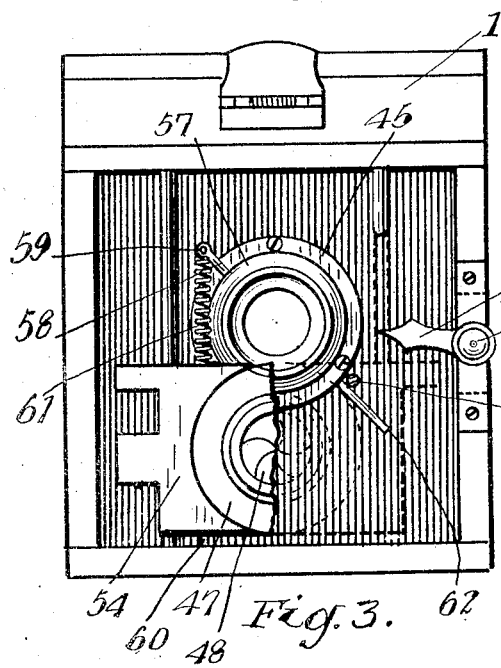
Fig. 3 is a front elevation of a camera, the front plate of the lens carrier being removed, the parts being shown in the focusing position.
Figure 4:
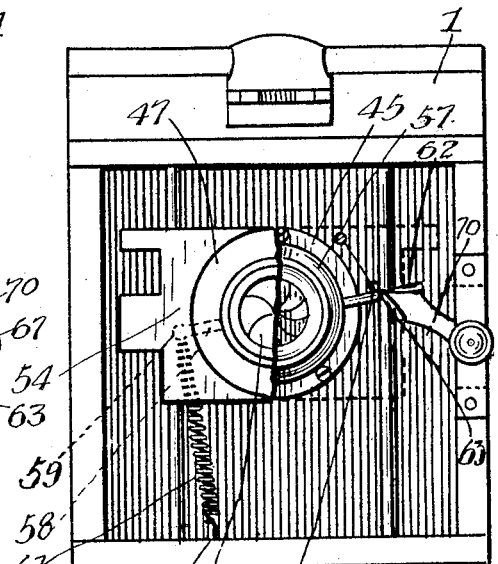
Fig. 4 is a similar view to Figure 3 showing the parts in the position they assume when taking a picture.

1 indicates the body of my camera which is of box construction. 40 indicates the front plate of my lens carrier, such front plate being provided with a slotted opening 41 and 42 is a back plate of the lens carrier having a central orifice 43. 44 is a collapsible bellows connecting the lens carrier with the body of the camera. 45 is the lens of the camera which is of ordinary construction and which is carried by the plate 42 in central alignment with the orifice 43 so as to operate in the usual manner common to all cameras. 46 are vertical guide rods secured within the lens and shutter carrier adjacent to the front plate 40 at each side of the orifice 41. 47 is a shutter of standard construction and known as a leaf type shutter, 48 being the leaves thereof which are operated in the usual manner by a trigger 49.

54 is a plate upon which the shutter 47 is mounted, such plate being provided with a light transmission orifice 55, each vertical lateral edge of the plate 54 is provided with a sleeve like portion 56. The sleeve like portions are slidable upon the vertical guide rods 46. The plate 54 carrying the shutter 47 is elevated to a position in central alignment with the lens 45 by any suitable manually operated means such as that disclosed in my above referred to copending applications.

57 is a ring which is turnably secured upon the lens 45 so as to freely revolve therearound. 58 is a pin extending from the ring 57 and provided at its outer end with an eye 59. 60 is an eye or other suitable anchoring means secured to the bottom of the lens carrier. 61 is a tension spring connected at its lower end to the eye 60 and at its upper end to the eye 59. 62 is a pin also extending from the ring 57 at a point diametrically opposite to the pin 58. 63 is a pin extending inward from the plate 54, such pin normally bearing upon the pin 62 when the plate 54 and the shutter 48 is in the focusing position.

64 is a graduated plate secured to the from plate 40. 65 is a crank shaft journalled in the front plate 40 and extending inward into a slotted recess 66 formed in the side wall of the lens carrier. 67 is a knob secured to the outer end of the crank shaft 65. 68 is a sleeve mounted upon the crank shaft within the slot 66 and 69 is a compression spring extending around the crank shaft 65 between the sleeve 68 and the crank arm 65× of the crank shaft. The inner end of the arm 65× is provided with an inturned extension 65° which also extends over the pin 62. 70 is an indicating pointer carried upon the crank shaft 65 adjacent to the knob 67 and at the outside of the plate 40. The indicating pointer is held in contact with the plate 64 by means of the tension spring 69, the plate 64 is provided with a series of indentations 71 which are successively engaged by a projection 72 extending inward from the pointer. The indications of the plate 64 are those required for providing the various degrees of lens openings necessary in taking pictures. When the camera is in the normal position as indicated in Figure 1 the lens is in the open position and therefore the picture is viewed upon the ground glass of the camera with the lens in such open position. When the shutter is raised the pin 63 is carried upward thereby, releasing the pin 62 and permitting the ring 51 to turn around the lens 45, thereby allowing the lens to close. The degree to which the lens is closed is controlled by the position of the inturned end 65° of the crank arm 65×. If a smaller opening of the lens is desired the pointer 70 is moved upwardly and when a larger opening is required, downwardly. By this movement the inturned end 65° is raised to an equal degree. When the pin 62 is released by the pin 63 and the ring 57 turned to close the shutter 45, the pin 62 is carried upward until it strikes the inturned end 65°, thereby holding the lens from closing to any further degree. If it is desired to close the lens the pointer 70 is moved upwardly, carrying the inturned end 65° upward a further distance and therefore permitting the pin 62 to rise to a greater degree and permit the lens to further close. When the shutter 47 is again dropped the pin 63 engages the pin 62, the weight of the shutter then turning the ring 57, overcoming the tension of the spring 58 and thereby again turning the lens to the open position.

It will also be understood that although I have shown my device as operable upon the vertical movement of the shutter it might be operated from any other movable device forming part of a reflecting camera such as a swinging mirror or by a trigger which controls the mirror.

From this description it will be seen that I have devised a very simple device whereby the lens of the camera of the type disclosed by my copending applications Serial Numbers 270,662 and 592,096 will always be held in the fully opened position during the focusing of the picture and will automatically close to any required predetermined extent when the shutter is raised to the picture taking position.

What I claim as my invention is.

1. In a camera, the combination with a lens and a vertically movable shutter, of means for holding the lens in the open position by the weight of the shutter and means for closing the lens by the raising of the shutter.

2. In a camera, the combination with a lens and a vertically movable shutter, of a ring supported by the lens, tension means for holding the lens ring in its normal position, coacting means carried by the shutter and the lens opposing the tension of the aforesaid spring to hold the lens in the open position by the weight of the shutter.

3. In a camera, the combination with a lens and a vertically movable shutter, of a ring turnably supported upon the lens, resilient means resisting the turning movement of the ring, a pin extending radially from the ring and a pin extending inward from the shutter across the path of the radial pin.

4. In a camera, the combination with a lens and a vertically movable shutter, of a ring turnably supported upon the lens, resilient means resisting the turning movement of the ring, a pin extending radially from the ring and a pin extending inward from the shutter across the path of the radial pin, and means for limiting the movement of the radial pin when released by the upward movement of the shutter.

5. In a camera, the combination with a lens and a vertically movable shutter, of a ring turnably supported upon the lens, resilient means resisting the turning movement of the ring, a pin extending radially from the ring and a pin extending inward from the shutter across the path of the radial pin, a graduated plate carried upon the face of the camera, a turnable pointer coacting therewith, a projection coacting with the pointer and lying in the path of the radial pin, and means for holding the pointer in any position to which it is adjusted in relation to the plate.

6. In a camera, the combination with a lens and a vertically movable shutter, of a ring turnably supported upon the lens, resilient means resisting the turning movement of the ring, a pin extending radially from the ring and a pin extending inward from the shutter across the path of the radial pin, a graduated plate carried upon the face of the camera, a turnable pointer coacting therewith, a projection coacting with the pointer and lying in the path of the radial pin, a projection carried by the pointer adapted to engage the graduated plate, and spring means for forcing such projection into contact with the plate.

7. In a camera, the combination with a lens and a vertically movable shutter, of a ring freely surrounding the lens, spring means resisting the movement of the ring, a pin extending radially from the ring, a pin extending inward from the shutter across the path of the radial pin, a crank shaft carried by the camera having a portion extending also across the path of the radial pin, a pointer carried by the crank shaft exteriorly of the camera, and a graduated plate carried by the camera coacting with the pointer.

8. In a camera, the combination with a lens and a vertically movable shutter, of a ring freely surrounding the lens, spring means resisting the movement of the ring, a pin extending radially from the ring, a pin extending inward from the shutter across the path of the radial pin, a crank shaft free to move longitudinally carried by the camera having a portion extending also across the path of the radial pin, a pointer carried by the crank shaft exteriorly of the camera, a graduated plate carried by the camera coacting with the pointer, a spring resisting the longitudinal movement of the crank shaft, a series of indentations formed in the graduated plate and a projection carried by the pointer adapted to engage any one of such graduations.

JOSEPH MASKI.